April 21, 1936.   C. F. OBERMAIER ET AL   2,038,377
ELECTRICAL CABLE
Filed Aug. 21, 1931

Inventors:
Carl F. Obermaier,
Murray H. Owen,
by Charles W. Mueller
Their Attorney.

Patented Apr. 21, 1936

2,038,377

UNITED STATES PATENT OFFICE 2,038,377

ELECTRICAL CABLE

Carl F. Obermaier, York, Pa., and Murray H. Owen, Stratford, Conn., assignors to General Electric Company, a corporation of New York Application August 21, 1931, Serial No. 558,535

6 Claims. (Cl. 173—264)

The present invention relates to electrical cables and is particularly concerned with an electrical cable which is heat-resistant, moisture-proof and of high dielectric strength.

Cellulosic material, such as regenerated cellulose, commonly known as "cellophane", has been found to be excellent insulation material because of its high dielectric strength. However, difficulty is encountered in its use as insulation on conductors because when exposed to the atmosphere such material deteriorates very fast. It has hence not been practical to employ cellulosic material, such as regenerated cellulose, by itself, for covering conductors to insulate the latter.

Electrical cables requiring heat resistance have usually been constructed with asbestos as the insulation material. Asbestos, however, has little dielectric strength and therefore asbestos covered conductors are limited in their application where higher voltages are concerned or where high dielectric strength is required. It has, therefore, been desirable to obtain a heat-resistant insulation for conductors which would at the same time have high dielectric strength.

It has been found that when cellulosic material, particularly regenerated cellulose, is suitably associated with asbestos, particularly felted asbestos, and such composite insulation applied to a metallic conductor a cable is produced which is not only heat-resistant but in addition has excellent dielectric strength, the asbestos effectively protecting the cellulosic material from deterioration.

For a consideration of what is believed to be novel and the invention, attention is directed to the following specification and the claims appended thereto.

Figure 1:
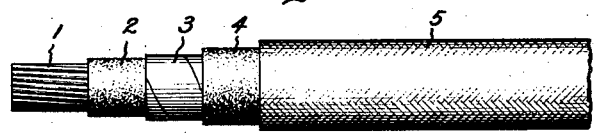
Figure 2:
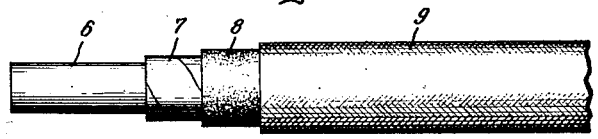

In the drawing accompanying and forming part of this application, Figure 1 is a fragmentary view in elevation of a cable constructed in accordance with the present invention part of the insulation being removed to more clearly show the several layers thereof; and Figure 2 is a similar view of a slightly modified construction of cable in accordance with the invention.

The numeral 1 designates a conductor which has been shown for the sake of illustration as of the single stranded type and which is of any suitable metal, for instance copper. Directly on the conductor 1 is applied a layer of asbestos 2, preferably long fibre asbestos in the felted state. The asbestos is compacted on the conductor to produce a uniform and homogeneous layer of insulation thereon. This layer of asbestos is now treated with well known flame and moisture-proof agents.

On the asbestos layer 2 is next applied in any suitable manner, as for example by taping, a layer 3 of cellulosic material, such as regenerated cellulose. After the layer of cellulosic material has been applied, another layer 4 of asbestos is applied and impregnated in a manner similar to that employed in connection with the layer 2. The insulated cable is provided with a protective covering 5, such as an asbestos braid or a metallic sheath, for example a lead sheath, or suitable combinations of the two as desired or as conditions may require. If an asbestos braid is used as the outer protective covering it is preferably impregnated with the usual flame and moisture-proofing compounds.

In Figure 2 there is shown a slightly modified construction of cable in accordance with the invention which construction is preferable where the conductor 6 is of the solid type. Where such a conductor is employed there is no especial need for a layer of asbestos on the conductor. The regenerated cellulose may therefore be applied directly to the conductor as shown at 7 after which one or more layers of asbestos 8, preferably in the felted state, are compacted thereon and then treated with the usual flame and moisture proofing agents. Finally a protective covering 9 is applied. This protective covering may take the form of a fibrous braid, such as a cotton or asbestos yarn braid, or a lead sheath, or suitable combinations of the two, as may be desired or as conditions may require.

In the construction shown in Figure 1 the layer of regenerated cellulose is effectively protected from the atmosphere and any air which may be entrapped between the strands of wire of the conductor. Since the construction shown in Figure 2 utilizes a solid type conductor obviously no air can reach the regenerated cellulose from the conductor side and their is no need of utilizing a layer of asbestos for this purpose on the conductor itself as well as on the regenerated cellulose layer.

Instead of applying the regenerated cellulose and asbestos separately to the conductor, as described, these materials may be applied as a unit. For example a layer or layers of felted asbestos may be united in any suitable manner with a thin sheet of regenerated cellulose, either one or both sides of the sheet being covered with asbestos, as the construction may require, and this united material applied to the conductor. Such a material is more fully described and claimed in the copending application of Carl F. Obermaier, Serial No. 576,433, filed November 20, 1931, and assigned to the assignee of the present invention.

A cable constructed in accordance with the present invention is not only simple in design but is of excellent dielectric strength and heat resistance. It affords a construction which is easy to manufacture and which possesses the excellent dielectric properties of cellulosic material such as regenerated cellulose. The thickness of regenerated cellulose may be varied to correspond with the dielectric requirements for which the wires or cables are designed.

What we claim as new and desire to secure by Letters Patent of the United States, is:—

1. An electrical cable comprising a metallic conductor, insulation therefor comprising layers of regenerated cellulose in sheet form and felted asbestos superposed directly on said conductor, and a protective covering over said insulation.

2. An electrical cable comprising a metallic conductor, regenerated cellulose in sheet form on said conductor, felted asbestos on said regenerated cellulose, and a protective covering on the asbestos.

3. An electrical cable comprising a metallic conductor, insulation therefor comprising regenerated cellulose in sheet form interposed between felted asbestos, said insulation being directly applied to said conductor and a protective covering over said insulation.

4. An electrical cable comprising a metallic conductor, a layer of felted asbestos on said conductor, a layer of regenerated cellulose tape on said layer of asbestos, and a second layer of felted asbestos on said regenerated cellulose.

5. An electrical cable comprising a metallic conductor, a sheet of regenerated cellulose insulation on said conductor, said regenerated cellulose insulation being interposed between layers of felted asbestos and sealed from the air.

6. An electrical cable consisting of a metallic conductor, a layer of felted asbestos on said conductor, a layer of regenerated cellulose tape on said asbestos layer, a second layer of felted asbestos on said regenerated cellulose tape, said asbestos layers being applied so as to effectively seal said regenerated cellulose tape from the air, and a protective covering on the second layer of asbestos.

CARL F. OBERMAIER.
MURRAY H. OWEN.